Feb. 4, 1930.  R. C. NASH  1,745,439
LAWN MOWER SHARPENER
Filed Aug. 23, 1927
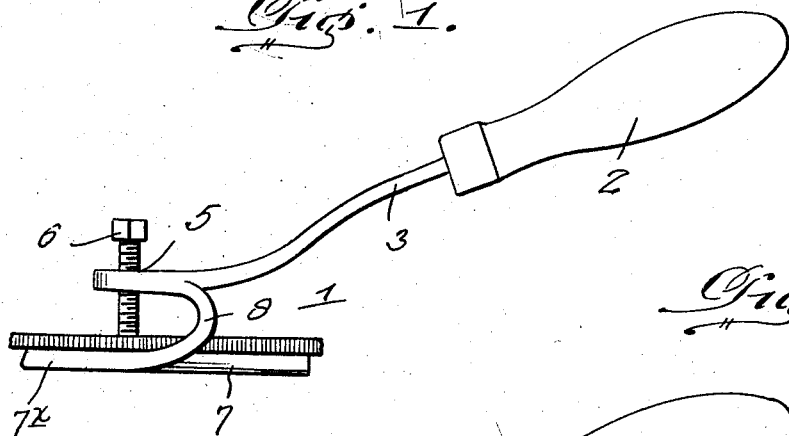
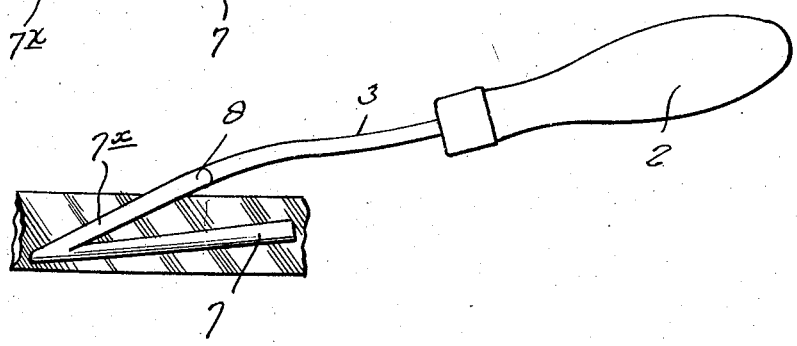
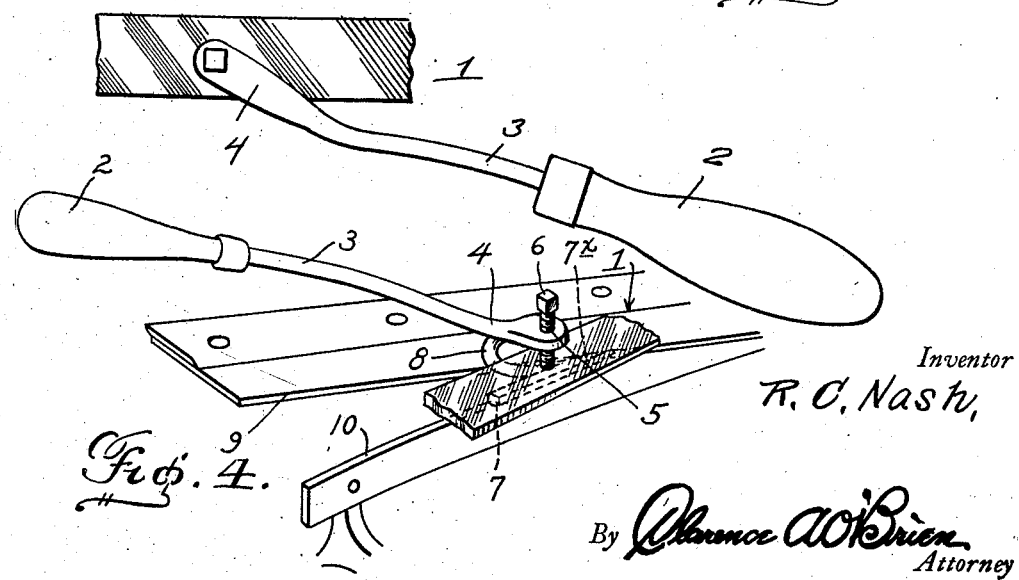
Inventor
R. C. Nash,
By Clarence A. O'Brien
Attorney Patented Feb. 4, 1930

1,745,439

UNITED STATES PATENT OFFICE

REUEL C. NASH, OF FAIRFAX, OKLAHOMA

LAWN-MOWER SHARPENER

Application filed August 23, 1927. Serial No. 214,877.

One object of my said invention is the provision of means for holding a file and for guiding or gauging the file on the fixed blade of a lawn mower while sharpening one of the revolving blades, this in order to retain the file at the same angle incident to the movement of the file against the revolving blade throughout the length of the latter with a view to assuring accurate sharpening of the revolving blade.

Another object of the invention is the provision of means for holding and guiding a file on the fixed blade of a lawn mower for the accurate and expeditious sharpening of said blade.

To the attainment of the foregoing, the invention consists in the improvement as hereinafter described and definitely claimed.

In the accompanying drawings, forming a part of this specification:—

Figure 1 is a side elevation illustrating the preferred embodiment of my invention and a file held therein, the said embodiment having been reduced to actual practice and successfully operated.

Figure 2 is an inverted plan view of the same.

Figure 3 is a top plan view of the device.

Figure 4 is a view illustrating the manner in which the preferred embodiment of the invention is used in sharpening the revolving blade of a lawn mower.

Similar numerals of reference designate corresponding parts in all of the views of the drawings.

In all of the views of the drawings, I show a portion 1 of a file, and in this connection I would have it distinctly understood that the file may be of the ordinary type such as used for sharpening lawn mower blades or may be of any other approved type adapted for said purpose.

My novel device which is in the form of a file holder and gauge comprises among other elements a handle 2 which may be and preferably is of wood.

Fixed in the handle 2 is a metallic shank 3 which is enlarged at its end remote from the handle 2 as designated by 4 and is provided in said enlarged portion with a threaded aperture 5 for the reception and engagement of a set screw 6. The said set screw 6 is disposed as illustrated in Figures 1 and 3 in order to clamp and securely hold the file portion 1 against the guide portion 7 of my improvement which portion 7 as clearly brought out in Figures 1 and 2 is designed to rest against the file portion 1 and at the opposite side of said file portion 1 with reference to the inner end of the screw 6 and the before described shank portion 4.

The guide portion 7 constitutes an important feature of my invention and by reference to Figures 1 and 2, it will be appreciated that the said guide portion is preferably in the form of an acute angle with one of the arms of the angle shorter than the other arm and with the said short arm designated by 7$^\times$ connected with the enlarged portion 4 of the shank 3 through the medium of a bight 8 which in the preferable use of the device is designed to straddle one edge of the file portion 1 after the manner shown in Figure 1.

In Figure 4 of the drawings, the reference character 9 designates the fixed blade of a lawn mower, and the reference character 10 designates one of the revolving blades.

When it is desired to sharpen the revolving blade of a lawn mower, without dismantling the mower, the revolving blades are turned, until the end of one revolving blade is substantially even with the stationary blade. My novel device is then placed upon the revolving blade 10, so that the file portion 1 rests upon the cutting edge of the blade 10, in such a manner, that the portions 7 and 7$^\times$ fit between the blade 9 and the revolving blade 10, the portion 7$^\times$ bearing against the edge of the stationary blade 9 and the portion 7 bearing against the sides of the revolving blade 10. With the device positioned, as stated, the device is moved along the edge of the revolving blade 10 and the file being maintained at the same angle incident to the sharpening of the edge of the blade 10 throughout its length, the provision of an accurate bevelled cutting edge upon the revolving blade will be assured. After the sharpening of one of the blades 10, the next revolving blade 10 is positioned, as stated, relative to the fixed blade 9, and the operation described is repeated, and so on, until all of the revolving blades 10 of the mower are sharpened. This latter will be better appreciated when it is stated that in the sharpening of any one of the revolving blades of a lawn mower that the arms 7× of the portion 7 is placed against the edge of the fixed blade of a lawn mower in parallelism to said edge and is moved against said edge while operating on the edge of the revolving blade that is being sharpened with the result that the file is maintained at the same angle on the edge of the revolving blade while being worked against said edge with the result that the sharpening of the edge of the revolving blade in an upward manner is assured.

My novel device is also adapted to be used to advantage in the sharpening of the fixed blade of a lawn mower, the said blade being preferably removed from the lawn mower, and my novel device being utilized to hold the file and to so guide the file relative to the blade that the original bevel of the blade will be retained when the file is operated against the edge of the blade.

I would further have it understood that when the set screw 6 is loosened, the file or file portion 1 may be set at various angles in the holder with a view to utilizing all of the cutting faces or surfaces on the sides of the file.

It will be apparent from the foregoing that with the use of my novel device a novice is enabled to sharpen a lawn mower in a short period of time and this while preserving the scientific lines involved originally in the cutting edges of the mower.

It will also be apparent that my novel device is simple, compact, and inexpensive in construction, and in general, is well adapted to withstand the uses to which file holders and analogous devices are ordinarily subjected.

I have entered into a detailed description of the construction and relative arrangement of the parts contained in the present and preferred embodiment of my invention in order to impart an exact understanding of said embodiment. I do not desire, however, to be understood as limiting myself to the construction shown, my invention being defined by my appended claim within the scope of which modifications may be made without departure from my invention.

I claim:—

A device for the purpose described comprising a base and guide portion of acute angle form or V-shape, a shank having an aperture in its forward portion and also having said aperture threaded, a bight connecting one arm of the V-shaped portion and the forward portion of the shank and maintaining the V-shaped portion in spaced relation to the forward portion of the shank, a clamping screw disposed in the threaded aperture of the shank, and a handle on the rear portion of the shank; one of the arms of the said V-shaped portion being adapted to be guided against the fixed blade of a lawn mower incident to the longitudinal sliding movement of a file or file portion clamped between the screw and the V-shaped portion, against the edge of a revolving lawn mower blade.

In testimony whereof I affix my signature.

REUEL C. NASH.